Patented Apr. 4, 1939

2,152,642

UNITED STATES PATENT OFFICE 2,152,642

TREATMENT OF TUNG OIL

Walter J. Harper, Lakewood, Ohio, assignor to The Glidden Company, Cleveland, Ohio, a corporation of Ohio No Drawing. Application December 4, 1933, Serial No. 700,880

7 Claims. (Cl. 260—407)

This invention relates to a method of treating tung oil, to yield a treated oil which will dry rapidly to a clear, hard film. More particularly, it contemplates the treatment of raw tung oil with selenium or other chemicals to prevent gelation on subsequent heat treatment, and extraction of the chemical after such treatment.

Tung (China-wood) oil is in common use in the paint and varnish industry because of its waterproofness and rapid drying. It is composed largely of the tri glyceride of elaeostearic acid, an isomer of linolic acid; the acid which forms the major constituent of linseed oil. Both acids have two double bonds; the superior drying and waterproofness of tung oil is, according to the leading theoretical chemists in the field, due to the fact that the bonds are separated by three single bonds (4 C atoms) instead of by two single bonds (3 C atoms) in the case of linolic acid.

While tung oil has certain advantageous features, two difficulties are encountered in working with it. The raw oil dries, under normal conditions, to a dull crystalline film, in distinction to the smooth, glossy film obtained by linseed oil. On heat-treatment of tung oil, it tends to form a gel; this tendency is so pronounced as to form the basis of a standard test for the purity of tung oil. The crystallization and dull drying of the oil can be overcome by the proper heat treatment; but before sufficient heat treatment can be given to impart to the oil the proper drying characteristics to yield a smooth glossy film.

To make tung oil varnishes, it has been common practice to heat-treat the tung oil in the presence of other oils and/or various resins. With such dilution and proper manipulation it is possible to obtain very satisfactory gloss varnishes. Another common practice has been to heat treat the tung oil just short of gelation, and prevent gelation by the addition of chill-back agents, such as oils and resins, completing the heat treatment after addition. In no case has it been possible, by this simple heat treatment, to prepare a workable, pure tung oil free of diluting material.

It has been proposed to obtain a heat-treated China-wood oil by heating the oil up rapidly, and cooling it rapidly enough to prevent gelation. This method is at best treacherous, as a very exacting technique is required, together with apparatus which will permit of rapid cooling. In ordinary varnish kettle equipment, the method is useless. If the oil is pumped through a tube, spot heated and rapidly cooled thereafter, the speed of flow of both oil and cooling medium must be carefully adjusted, as well as the rate of heating; if any of these is out of adjustment, a gel may be obtained, or a treated oil which crystallizes under ordinary or slightly adverse conditions. For these reasons, the method is uneconomical and generally unsatisfactory.

The availability of selenium and other chemicals (surfur, selenides, sulphides, etc.,) for retarding the gelation of tung oil has been known for some time. These chemicals inhibit heat gelation of tung oil for long periods. Unfortunately, they not only prevent gelation, but have an injurious effect on the drying properties of the oil; depending on the quantity of chemical used, the dry is slowed. If sufficient chemical is used to prevent gelation, the dry is ordinarily too slow for ordinary paint work; it is even possible to make the oil non-drying by adding an excess of one of these chemicals. As a result, they have been valueless in the production of a satisfactory treated tung oil, from the drying standpoint.

I have discovered that wood oil may be heat-treated in the presence of selenium, etc., to yield an oil which will dry to a smooth, glossy film, without any sacrifice in the drying speed of the tung oil, if, after heat-treatment, the selenium is extracted from the oil. This may be accomplished by choosing solvents which will dissolve the portions of the oil to which the selenium is attached, without dissolving the bulk of the oil. A mixture of aliphatic alcohols has been found to be satisfactory for the purpose; such a mixture is immiscible with the oil when cold, is miscible when hot so that contact is very thorough, and it retains the portion of the oil to which the selenium is attached after cooling and separation from the main body of the oil.

As an example of my invention, I add to tung oil 0.04% of selenium metal powder, and heat the mixture for 15 minutes at 585° F. This heat-treatment is sufficient to destroy the tendency of the wood oil to dry flat and crystalline. After cooling to a relatively low temperature, about 150 deg. F. I add a mixture of 90% amyl alcohol and 10% ethyl alcohol, in equal volume to the oil. The mixture is maintained just below the boiling point of the ethyl alcohol for 5-10 minutes, and then cooled; the alcohols separate from the oil portion, and are drawn off the top. A second washing removes the last trace of selenium. The extracted and treated wood oil remains behind; a very small fraction is carried off, along with the selenium, with the alcohols.

These may be recovered by distillation for later use. If slight traces of solvent remain in the oil, they may be boiled out. The treated oil dries with the approximate speed of raw wood oil to a smooth, lustrous, clear film.

The time and temperature of treatment depends on the viscosity desired in the treated oil. The heat may be as low as 550° F. for 15 minutes or even 50 or more degrees lower if more time is given; the upper limit is set on economical grounds at 600° F. These temperatures and times may be varied somewhat without departing from the spirit of my invention; the ruling consideration should be to get sufficient heat treatment to prevent crystallization, and as much extra as is desired for viscosity.

The amount of selenium added should be sufficient to prevent gelation, but not so excessive as to make removal difficult. A minimum of 0.03% is required to prevent gelation under most conditions while 0.05% will prevent gelation even when the heat-treatment is prolonged.

Sulfur and sulphides have been used by previous investigators to replace selenium and selenide in retarding the gelation of wood oil. While they give results of this nature if more is used, they darken the oil to such a degree that their use is objectionable.

The proper choice of solvent is important. In general, the hydrocarbon solvents are too strong in solvent action, dissolving the treated oil completely. The common esters, ketones, and other nitrocellulose solvents are powerful solvents, while the higher water insoluble aliphatic acids are also solvents, at least when heated; but all of these may be mixed with the non-solvent lower alcohols (ethyl, methyl, isopropyl) to yield mixtures which are strong enough in solvency to mix under certain conditions, but weak enough to separate under other conditions. The separation may be made by mixing with a small portion of solvent, thus getting miscibility, and then adding enough extra solvent to cause separation into two layers. We prefer to use a mixture which will dissolve the oil when hot, but not when cold. The higher alcohols are satisfactory in themselves, particularly butanol and amyl alcohol; but refrigeration is necessary to get complete separation. By adding 5-20% of one of the lower alcohols, the separation is complete on mere cooling to ordinary room temperatures.

The washing with the solvent may be run with relatively high percentages of solvent and few washes, or less solvent and more washes. This is a matter of technique and convenience in handling.

While certain specified chemicals and solvents give superior results from the point of view of economy of operation, my invention is not limited to these specific details, but contemplates broadly the heat-treatment of tung oil with chemicals to prevent gelation, and the subsequent solvent-extraction of the chemical, to permit the oil to dry in a normal manner.

Having described my invention, what I claim is:

1. A method of treating tung oil, which comprises heat-treating the oil in the presence of a chemical of the group consisting of sulfur, sulfides, selenium and selenides, which both retards the heat gelation of tung oil and its drying, to a point where the tung oil yields a smooth, glossy film, thereafter mixing the oil with a solvent which is miscible with the body of oil when hot, but immiscible when cold, and which carries with it on separating from the body of the oil the chemical together with only a minor portion of the oil, and separating the body of the oil from the solvent, whereby a smooth glossy rapid drying treated tung is obtained.

2. A method of treating tung oil, which comprises heat-treating the oil in the presence of selenium, which both retards the heat gelation of tung oil and its drying, to a point where the tung oil yields a smooth, glossy film, thereafter mixing the oil with a solvent which is miscible with the body of oil when hot, but immiscible when cold, and which carries with it on separating from the body of the oil the selenium together with only a minor portion of the oil, and separating the body of the oil from the solvent, whereby a smooth glossy rapid drying treated tung is obtained.

3. The method of claim 1, in which the heat-treatment comprises heating the oil for at least 15 minutes at 500 to 600° F.

4. The method of claim 2, in which the heat-treatment comprises heating the oil for at least 15 minutes at 500 to 600° F.

5. The method of claim 2, in which the solvent is a lower aliphatic alcohol.

6. The method of claim 2, in which the solvent is a mixture of water soluble and water insoluble lower aliphatic alcohols.

7. The method of claim 2, in which the solvent is a mixture of amyl alcohol and 5 to 20% ethyl alcohol.

WALTER J. HARPER.